(No Model.)

T. HAGERTY.
INSTRUMENT FOR CUTTING WASHERS.

No. 245,629. Patented Aug. 16, 1881.

WITNESSES
W. J. Cuthbertson
C. N. Hitchcock

INVENTOR
Thomas Hagerty

UNITED STATES PATENT OFFICE.

THOMAS HAGERTY, OF SAN FRANCISCO, CALIFORNIA.

INSTRUMENT FOR CUTTING WASHERS.

SPECIFICATION forming part of Letters Patent No. 245,629, dated August 16, 1881.

Application filed January 5, 1881. (No model.)

*To all whom it may concern:*

Be it known that I, THOMAS HAGERTY, of the city and county of San Francisco, and State of California, have invented a new and useful Improvement in Instruments for Cutting Washers and Small Wooden Disks or Bosses, such as used in pattern-making, of which the following is a specification.

The object of my invention is to produce a cheap implement for cutting washers of leather and for the use of pattern-makers in making small hubs or bosses of wood, and which shall also serve as dividers or compasses to measure the size of the article to be cut.

The invention is twofold.

First, I construct the two main pieces or legs of the implement of sheet metal, with a pointed and a cutting leg, the cutting-leg being formed by twisting the blade or the leg designed for cutting at right angles and sharpening the same as desired for cutting as the compass is swept around. The other leg is sharpened to a point to form the stationary leg.

Secondly, I secure a firm, reliable measure to caliper or measure the size of the washer or disk to be formed.

Figure 1:
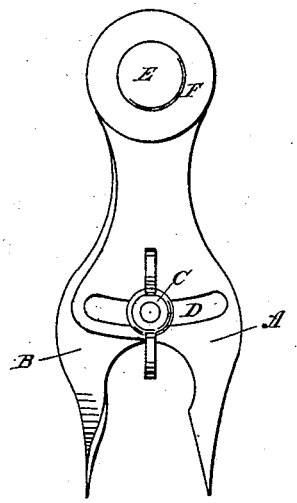
Figure 2:
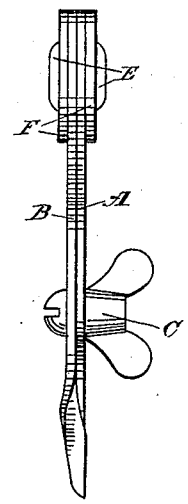
Figure 4:
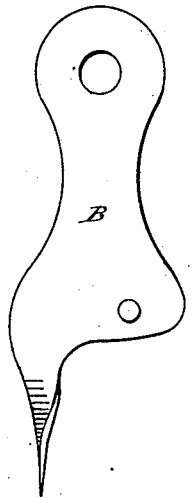
Figure 5:
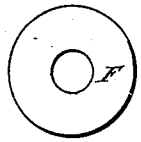
Figure 3:
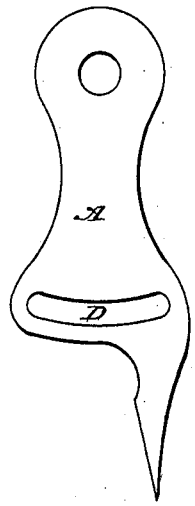

Figure 1 is a front elevation, and Fig. 2 a side elevation, of the implement complete. Figs. 3 and 4 show the stationary and movable or cutting leg separately, and Fig. 5 shows the washer.

The legs A and B are of the same pattern and cut from sheet-steel with the same dies.

The leg A is slotted to receive the adjusting-screw C, and has its point ground similarly to the ordinary compass or divider leg.

The leg B has its point flattened like a pen-knife point, and, after being ground and rough-finished, is twisted so as to bring the cutting-edge at a right angle with the body of the leg. It is then tempered and finished. The leg B has the adjusting-post attached in the usual way, so as to pass through the slot D to receive the set-screw C.

The legs A and B are united by means of any suitable rivet, E, and washer F on either side—a device well known to those skilled in the art.

The implement may be finished in any style to suit the taste as to ornamental finish without deviating from the construction as described.

Having thus described my invention, what I claim is—

A combined compass and washer-cutter composed of two pieces of sheet metal, A and B, one of which is slotted, as described, and forms a compass-leg or center, and the other having its cutting-point formed at right angles to the plane of its body, and both secured together by means of the rivet E and adjusting-screw C, constructed and operated substantially as and for the purposes set forth.

THOMAS HAGERTY.

Witnesses:
W. J. CUTHBERTSON,
C. N. HITCHCOCK.